United States Patent
Fei et al.

(10) Patent No.: US 7,615,907 B2
(45) Date of Patent: Nov. 10, 2009

(54) SEGMENTED INNER STATOR AND BRUSHLESS PERMANENT MAGNET MOTOR WITH THE SAME

(75) Inventors: Renyan W. Fei, Qingdao (CN); Yanguang Xu, JiaoZhou (CN)

(73) Assignee: Emerson Electronic Co., St. Louis, MO (US)

( * ) Notice: Subject to any disclaimer, the term of this patent is extended or adjusted under 35 U.S.C. 154(b) by 0 days.

(21) Appl. No.: 11/558,697

(22) Filed: Nov. 10, 2006

(65) Prior Publication Data

US 2007/0296302 A1 Dec. 27, 2007

(30) Foreign Application Priority Data

Jun. 26, 2006 (CN) .................. 2006 1 0093554

(51) Int. Cl.
*H02K 1/12* (2006.01)
(52) U.S. Cl. .................. 310/218; 310/254; 310/259
(58) Field of Classification Search ......... 310/216–218, 310/254, 259; *H02K 1/28, 1/12*
See application file for complete search history.

(56) References Cited

U.S. PATENT DOCUMENTS

| | | | |
|---|---|---|---|
| 2,870,357 A | 1/1959 | Vandenberg et al. | |
| 3,740,660 A | 6/1973 | Davies, Jr. | |
| 3,914,859 A | 10/1975 | Pierson | |
| 4,365,180 A | 12/1982 | Licata et al. | |
| 5,382,859 A * | 1/1995 | Huang et al. | 310/216 |
| 6,127,760 A * | 10/2000 | Nagasaki et al. | 310/254 |
| 6,369,483 B1 | 4/2002 | Hill | |
| 6,389,679 B1 | 5/2002 | Kliman et al. | |
| 6,400,059 B1 | 6/2002 | Hsu | |
| 6,583,530 B2 * | 6/2003 | Hsu | 310/254 |
| 6,659,385 B2 | 12/2003 | Akita et al. | |
| 6,762,525 B1 * | 7/2004 | Maslov et al. | 310/112 |
| 6,777,851 B2 | 8/2004 | Maslov | |
| 6,781,278 B2 * | 8/2004 | Liao | 310/254 |
| 6,787,951 B2 * | 9/2004 | Maslov et al. | 310/67 R |
| 6,806,615 B2 | 10/2004 | Enomoto et al. | |
| 6,844,653 B2 * | 1/2005 | Kolomeitsev et al. | 310/218 |
| 6,888,284 B2 | 5/2005 | Eggers et al. | |
| 6,891,306 B1 * | 5/2005 | Soghomonian et al. | 310/218 |

(Continued)

FOREIGN PATENT DOCUMENTS

JP 7-245895 9/1995

(Continued)

*Primary Examiner*—Quyen Leung
*Assistant Examiner*—Naishadh N Desai
(74) *Attorney, Agent, or Firm*—Senniger Powers LLP

(57) ABSTRACT

A segmented inner stator comprises a stator core and a stator winding. The stator core includes a plurality of core segments which are retained together in a circular arrangement by at least one retaining ring and are mated with each other. At least some of the core segments are provided with slots on the radial side surfaces. The at least one retaining ring comprises a radial extension portion extending along the axial side surface of the core segment. A plurality of corresponding axial projections are provided on the radial extension portion of the at least one retaining ring along the circumferential direction to be inserted into the slot on one of the core segments so that the core segments are not free to move axially and radially relative to each other or relative to the retaining rings.

24 Claims, 8 Drawing Sheets

U.S. PATENT DOCUMENTS

| | | | |
|---|---|---|---|
| 6,924,570 B2* | 8/2005 | De Filippis et al. | 310/71 |
| 6,924,575 B2 | 8/2005 | Baumeister et al. | |
| 6,927,524 B2 | 8/2005 | Pyntikov et al. | |
| 7,105,976 B2* | 9/2006 | Stewart et al. | 310/218 |
| 7,116,023 B2* | 10/2006 | Wang et al. | 310/71 |
| 7,122,933 B2* | 10/2006 | Horst et al. | 310/218 |
| 2002/0050541 A1 | 5/2002 | Akita et al. | |
| 2005/0104470 A1 | 5/2005 | Perkins et al. | |
| 2005/0168099 A1 | 8/2005 | Yamamoto et al. | |
| 2005/0212377 A1* | 9/2005 | Wang et al. | 310/259 |
| 2006/0066171 A1* | 3/2006 | Yanoi et al. | 310/254 |
| 2006/0071574 A1* | 4/2006 | Stewart | 310/218 |
| 2007/0096587 A1* | 5/2007 | Ionel et al. | 310/218 |

FOREIGN PATENT DOCUMENTS

| | | |
|---|---|---|
| JP | 9-191588 | 7/1997 |
| JP | 11-89128 | 3/1999 |
| JP | 11-341717 | 12/1999 |

* cited by examiner

SEGMENTED INNER STATOR AND BRUSHLESS PERMANENT MAGNET MOTOR WITH THE SAME

FIELD OF THE INVENTION

The present invention relates to a motor and more particularly, to a segmented inner stator and a brushless permanent magnet motor with the same.

BACKGROUND OF THE INVENTION

The use of brushless permanent magnet motors is becoming more prevalent in the motor industry because of their intrinsically high efficiency and low noise. Brushless permanent magnet motors can include either an outer stator configuration (FIG. 1a) or an inner stator configuration (FIG. 1b). In some applications, brushless permanent magnet motors can have a relatively large number of poles, as shown in FIG. 1b.

One-tooth segmented stator configurations are advantageous in that they save core material, increase slot fill, and are easily wound. Currently, however, one-tooth segmented stator configurations are only applied to outer stator configurations (conventional stator), as shown in FIG. 2, because the segmented configuration of the outer stator can be carried out easier than a segmented configuration for the inner stator. For a segmented outer stator, for example, each segment of the stator core can be secured together by an outer ring.

Inner stator configurations of brushless permanent magnet motors have been used in a large number of fields, such as electric bicycles and washing machines. However, one-tooth segmented configurations are not practically applied to the inner stator configurations because it is difficult and complicated to secure each segment of the inner stator core together.

SUMMARY OF THE INVENTION

In light of the background art discussed above, the technical problem to be solved in the present invention is to provide a one-tooth-segmented configuration of an inner stator that has low material cost, high slot fill, and that is easy to wind.

In order to solve the above-mentioned technical problem, one aspect of the present invention provides a kind of segmented inner stator for brushless permanent magnet motors. The segmented inner stator comprises a stator core and a stator winding with the stator core including a plurality of core segments which are retained together in a circular arrangement by at least one retaining ring and are mated with each other. At least some of the core segments are provided with slots on the axial side surfaces. The at least one retaining ring comprises a radial extension portion extending along the axial side surface of the core segment. A plurality of corresponding axial projections are provided on the radial extension portion of the retaining ring along the circumferential direction to be inserted into the slots so that the core segments are not free to move axially and radially relative to each other and relative to the retaining rings.

In one embodiment, the core segments are provided with first holes on the radial side surfaces and a plurality of second holes corresponding to the first holes on the core segments are disposed on the radial extension portion of the retaining ring along the circumferential direction and a fastener may be mounted by passing through the first and second holes respectively.

In another aspect, the segmented inner stator comprises two retaining rings which are assembled from the two axial sides to retain the plurality of core segments.

In yet another aspect, when the radial side surfaces of the core segments are provided with flat slots and first holes, the first holes are located in the middle of the flat slots to form the slots with holes. All the core segments are designed such that a configuration with a flat slot with a hole is provided on at least one radial side and the plurality of axial projections and the plurality of second holes are arranged alternately on the radial extension portion of the retainer.

In still another aspect, the inner stator can be assembled with a hub, on to which the core segments and the retaining ring assemblies are fastened by the fasteners. The hub is mated with the inner hole of the circular retaining ring so that it can strengthen the whole segmented stator configuration. The hub also supports the outer rotor of the brushless permanent magnet motor.

In yet a further aspect, each core segment is provided with a projection and a convex cutout on the two side surfaces along the peripheral direction for engaging with the adjacent core segments. These projections and convex cutouts are useful for positioning the core segments when they are assembled and during the assembling itself. They can even prevent the core segments from moving radially towards the outside when the core segments are assembled together.

In still yet another aspect, each of the two retaining rings are provided with axial extension portions extending along the radial inner side of the core segments so that when the two retaining rings are fitted together the axial extension portions are engaged with each other. The core segments abut against the outer circumference of the axial extension portion when they are assembled. That is to say, the axial extension portion supports the core segments. In the case of using two retaining rings, the end of the extension portion may be designed as a dentate configuration, so that the two retaining rings may be engaged together when assembling.

In yet another aspect, the distance between the two slots with holes of the core segments along the diameter direction is slightly larger than the distance between the two axial projections of the retaining ring along the diameter direction so that all the core segments can be pulled together along the radius direction when the axial projections of the retaining ring are inserted into the slots with holes of the core segments.

In still another aspect, the number of the core segments can be equal to that of the stator slots (in one example both are 24) so that the core segments may be wound alone to thereby improve the slot fill.

According to another aspect of this invention, a brushless permanent magnet motor is provided with the above-mentioned segmented inner stator.

The segmented inner stator reduces the consumption of the core material by using a plurality of core segments to form a stator core and thereby to form a segmented inner stator. Meanwhile, the number of the core segments is equal to that of the stator slots, thus the core segments can be wound alone, thereby to improve the slot fill and to be wound more easily.

Various refinements exist of the features noted in relation to the above-mentioned aspects of the present invention. Further features may also be incorporated in the above-mentioned aspects of the present invention as well. These refinements and additional features may exist individually or in any combination. For instance, various features discussed below in relation to any of the illustrated embodiments of the present invention may be incorporated into any of the above-described aspects of the present invention, alone or in any combination.

BRIEF DESCRIPTION OF THE DRAWINGS

Corresponding reference characters indicate corresponding parts throughout the drawings.

DESCRIPTION OF THE PREFERRED EMBODIMENTS

Figure 1B:
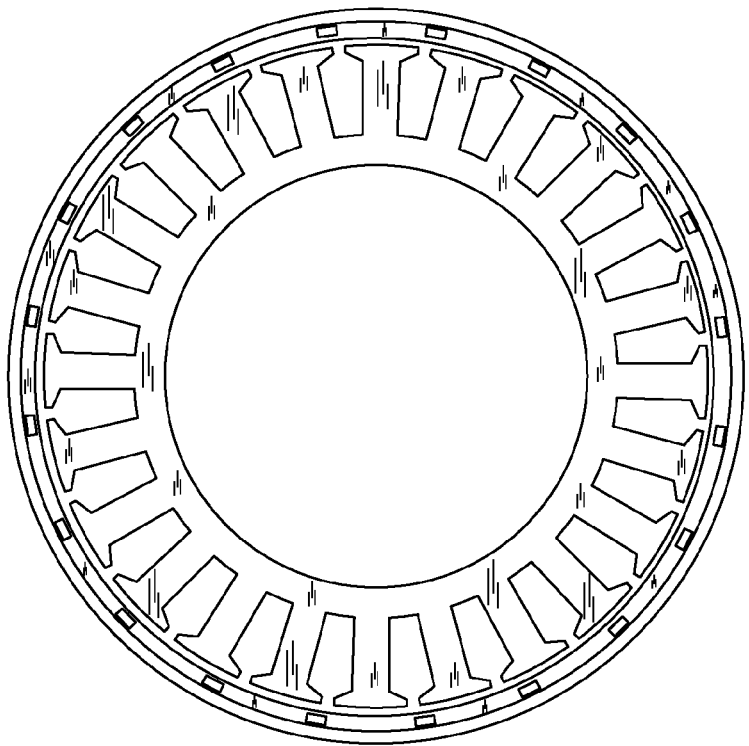
FIGS. 1a and 1b are front views showing prior art outer stator and inner stator, respectively, for a brushless permanent magnet motor.
Figure 1A:
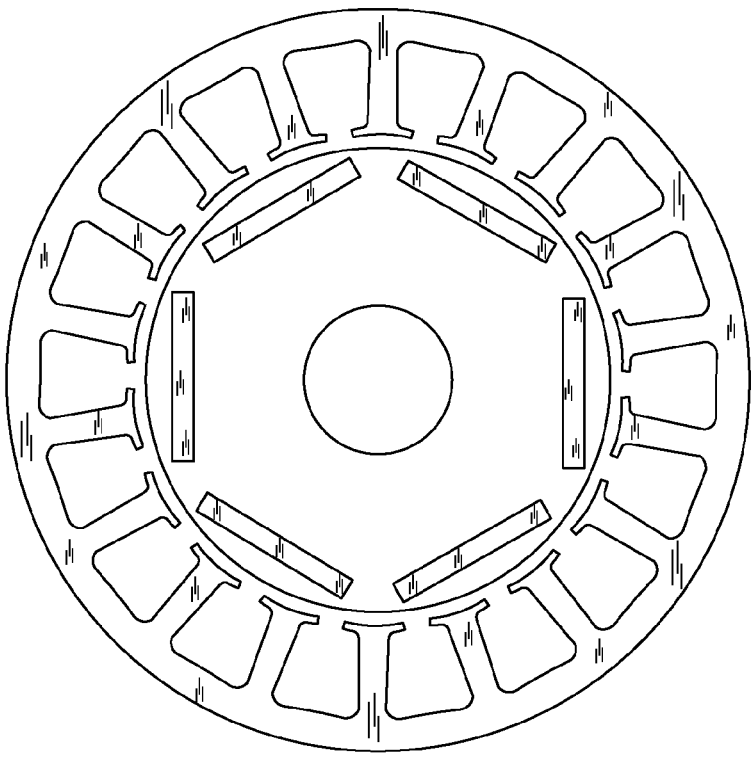
Figure 2:
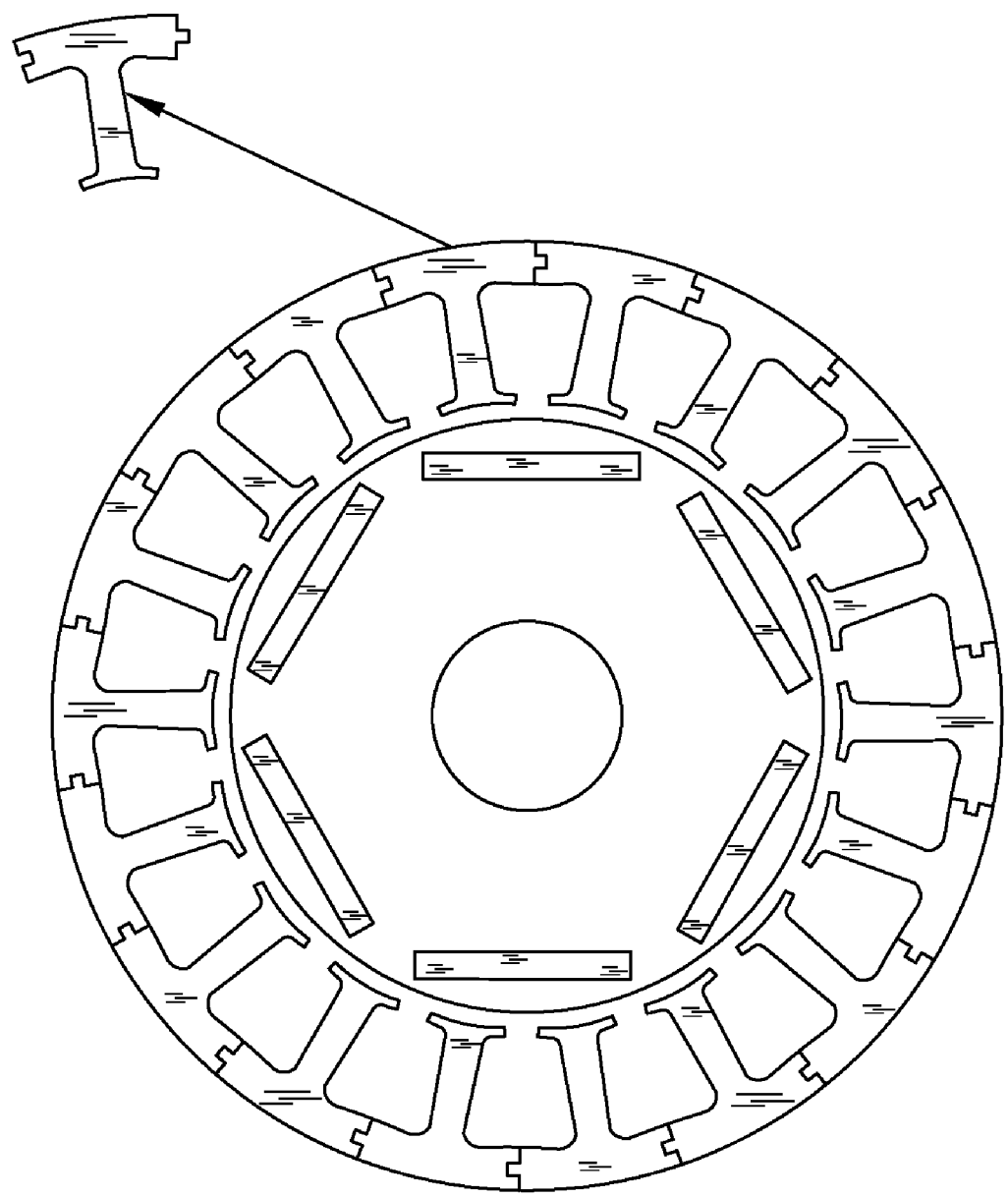
FIG. 2 is a front view showing a prior art segmented outer stator configuration for a brushless permanent magnet motor.

An exemplary embodiment of a segmented inner stator configuration according to the present invention will be explained with reference to the accompanying drawings, wherein identical parts are represented with identical reference numerals.

In the present description, the term "circumferential" indicates the peripheral direction of the circular retaining ring (or stator core); the term "axial" indicates the direction along the center line of the retaining ring; and the term "radial" indicates the direction perpendicular to the center line of the circular retaining ring and through the center of circle of the retaining ring.

Figure 3:
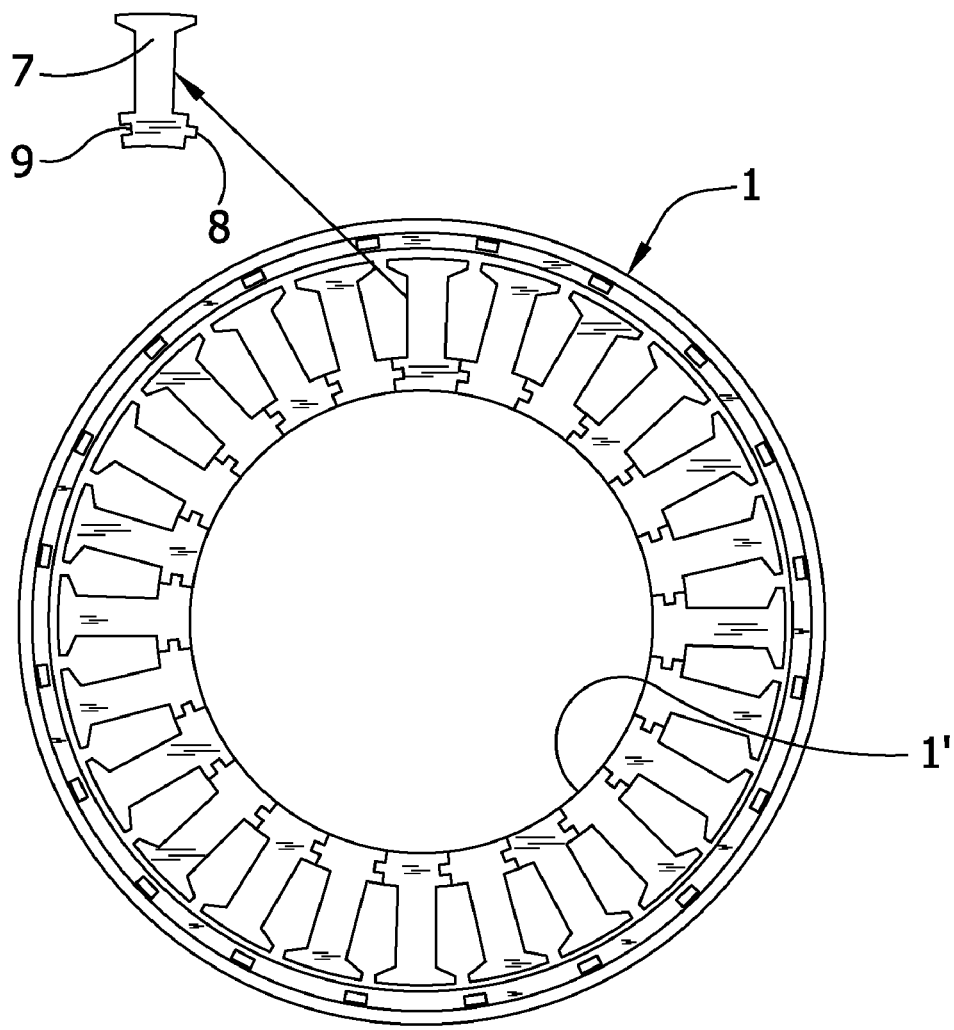
FIG. 3 is a front view showing a segmented inner stator configuration according to a first embodiment of the invention for a brushless permanent magnet motor.
Figure 4:
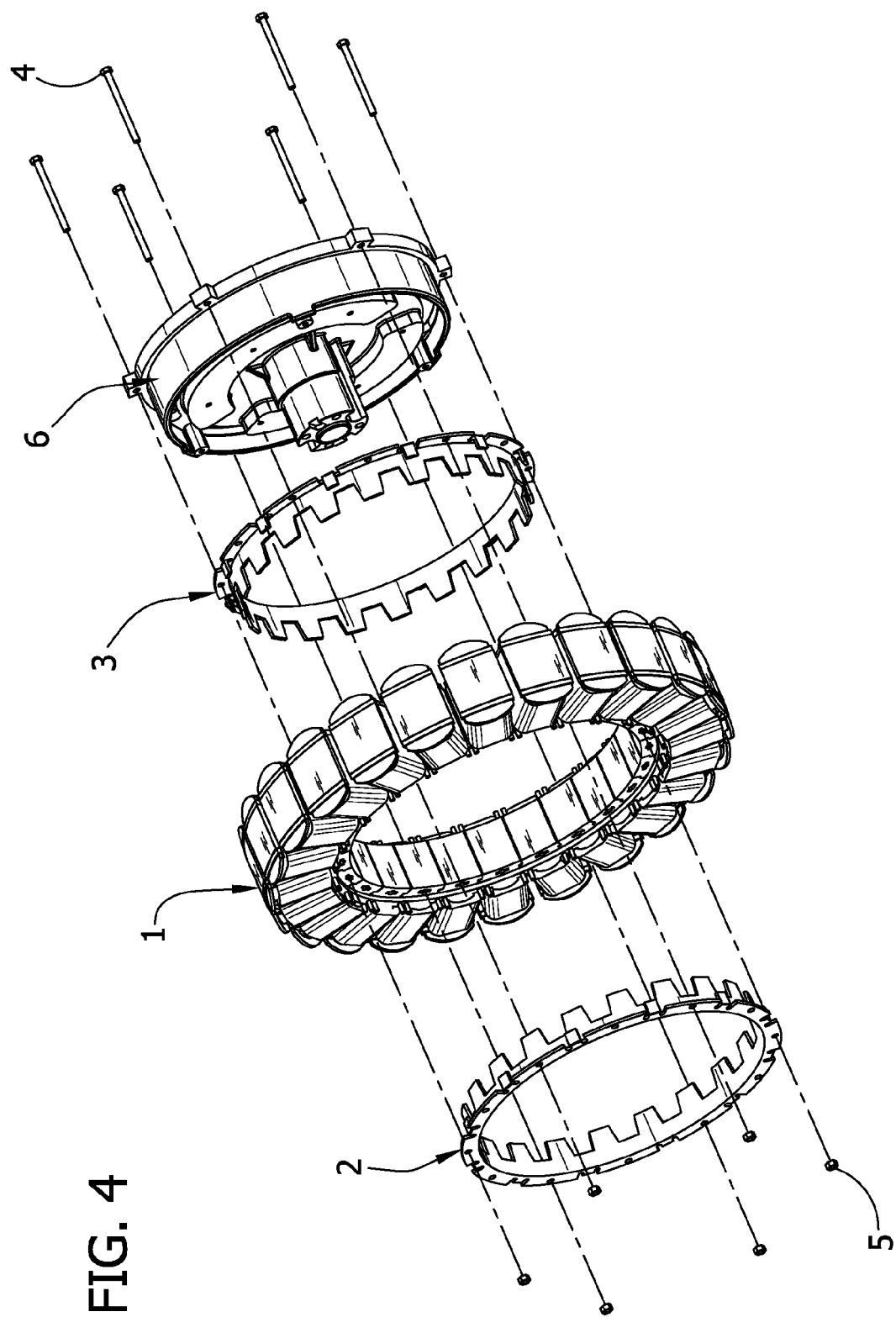
FIG. 4 is a perspective view showing the segmented inner stator.

As shown in FIGS. 3 and 4, a segmented inner stator configuration according to a first embodiment of this invention comprises an inner stator 1 including a stator core 1', a stator winding, and two circular retaining rings 2, 3.

Figure 7:
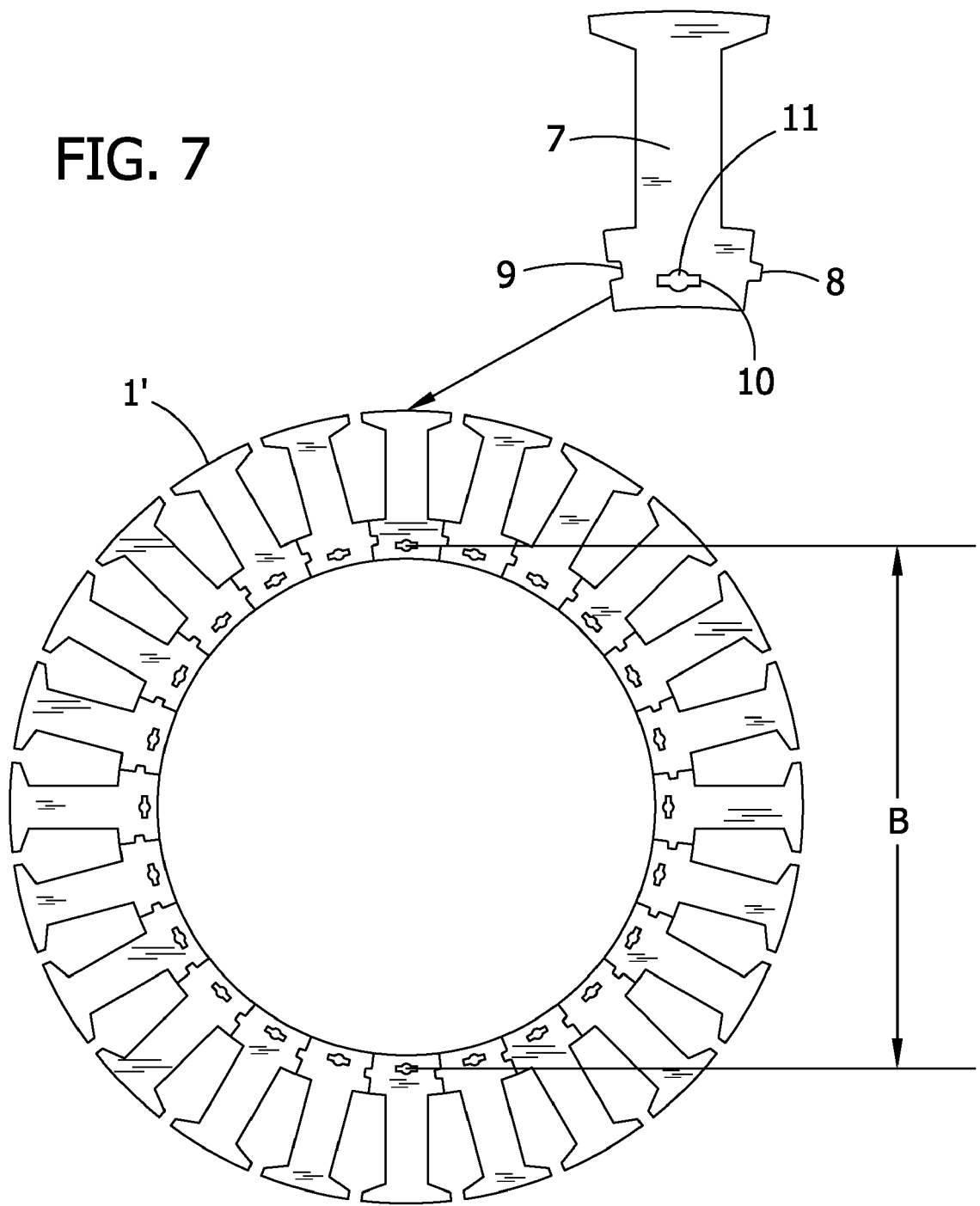
FIG. 7 is a front view showing stator core segments of the segmented inner stator.

As shown in FIG. 7, the stator core 1' comprises a plurality of generally T-shaped core segments 7. One of the two circumferentially facing side surfaces of each core segment 7, which are contacted with another core segment during assembling is provided with a projection 8, and the other side surface is provided with a concave cutout 9 adapted to be mated with the projection 8 on an adjacent core segment for locating the core segments 7 during assembling and for assembly itself. A long slot 10 with a hole 11 is provided approximately in the center of the two axially facing side surfaces of the core segments 7 near the radial inner end.

Figure 5:
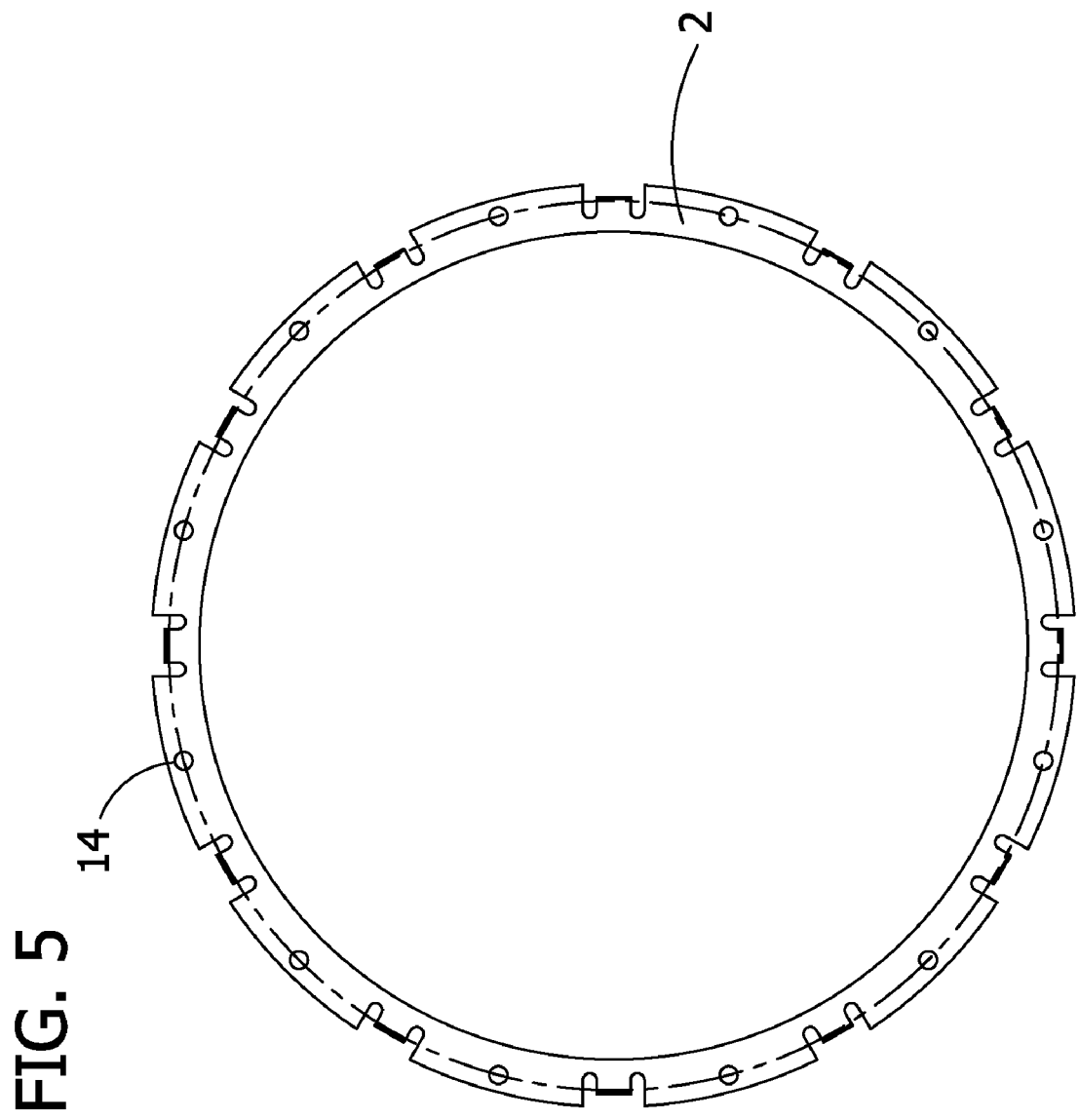
FIG. 5 is a front view showing retaining rings of the segmented inner stator of FIG. 4.
Figure 6:
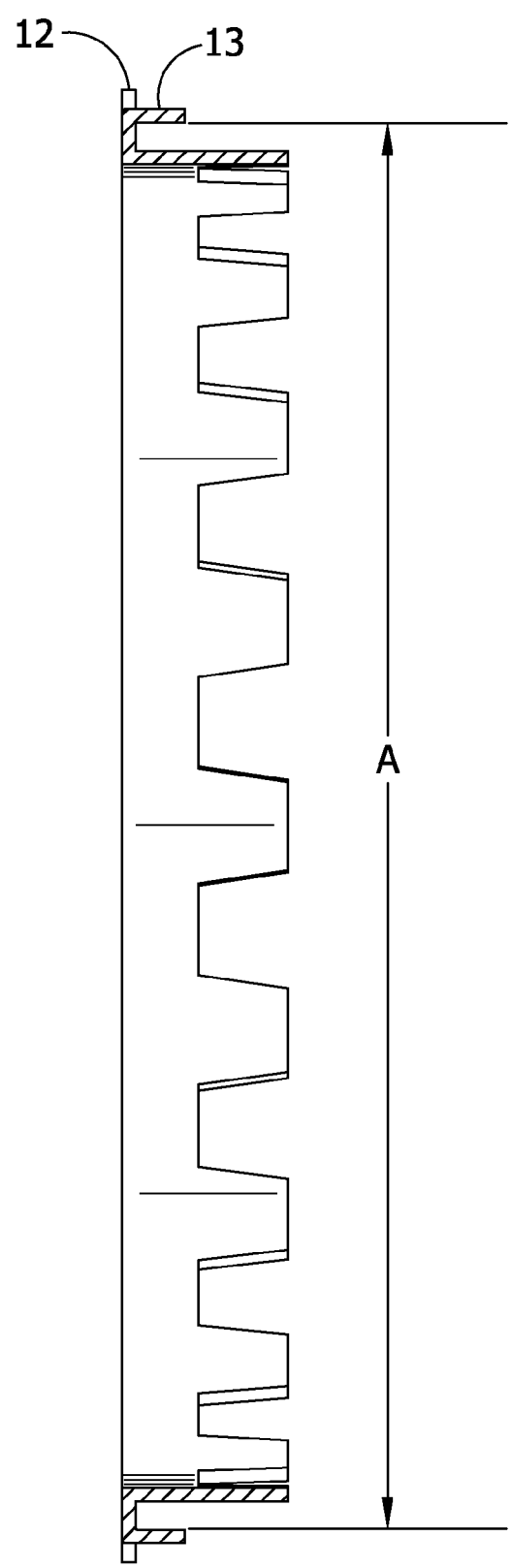
FIG. 6 is a side view showing the retaining ring of FIG. 5.

Referring to FIGS. 4, 5, and 6, the retaining rings 2, 3 are made of steel and comprise a radial extension portion extending along the axial side surfaces of the core segments and an axial extension portion inserted into the inner hole of the stator core. The radial extension portion is a flange 12 formed on the circumference of the retaining rings 2, 3 and extending along the radial direction, and a plurality of axial projections 13, which are designed to be mated with the long slots 10 with hole 11 in the segments 7, are provided on the flange along the circumferential direction for engagement with every other core segment. In the present embodiment, which has twenty-four (24) segments 7, there are twelve (12) axial projections 13. During assembling, the projections 13 are inserted into the long slot 10 with hole 11 in every other core segment 7, thereby to assemble a plurality of core segments together to form the stator core 1' as a whole. The axial extension portion of each of the illustrated retaining rings 2, 3 has a dentate configuration for engaging with the opposing retaining ring when the retaining rings are assembled. It is to be understood that such dentate configurations are dispensable.

When all of the core segments 7 are assembled together, as shown in FIGS. 6 and 7, the maximum distance B between the two long slots 10 with hole 11 along the diameter direction of the core segments 7 is slightly greater than the maximum distance A between the two projections 13 along the diameter direction of the retaining rings 2, 3 inserted thereinto, to thereby pull all of the core segments 7 together along the radius direction.

Figure 8:
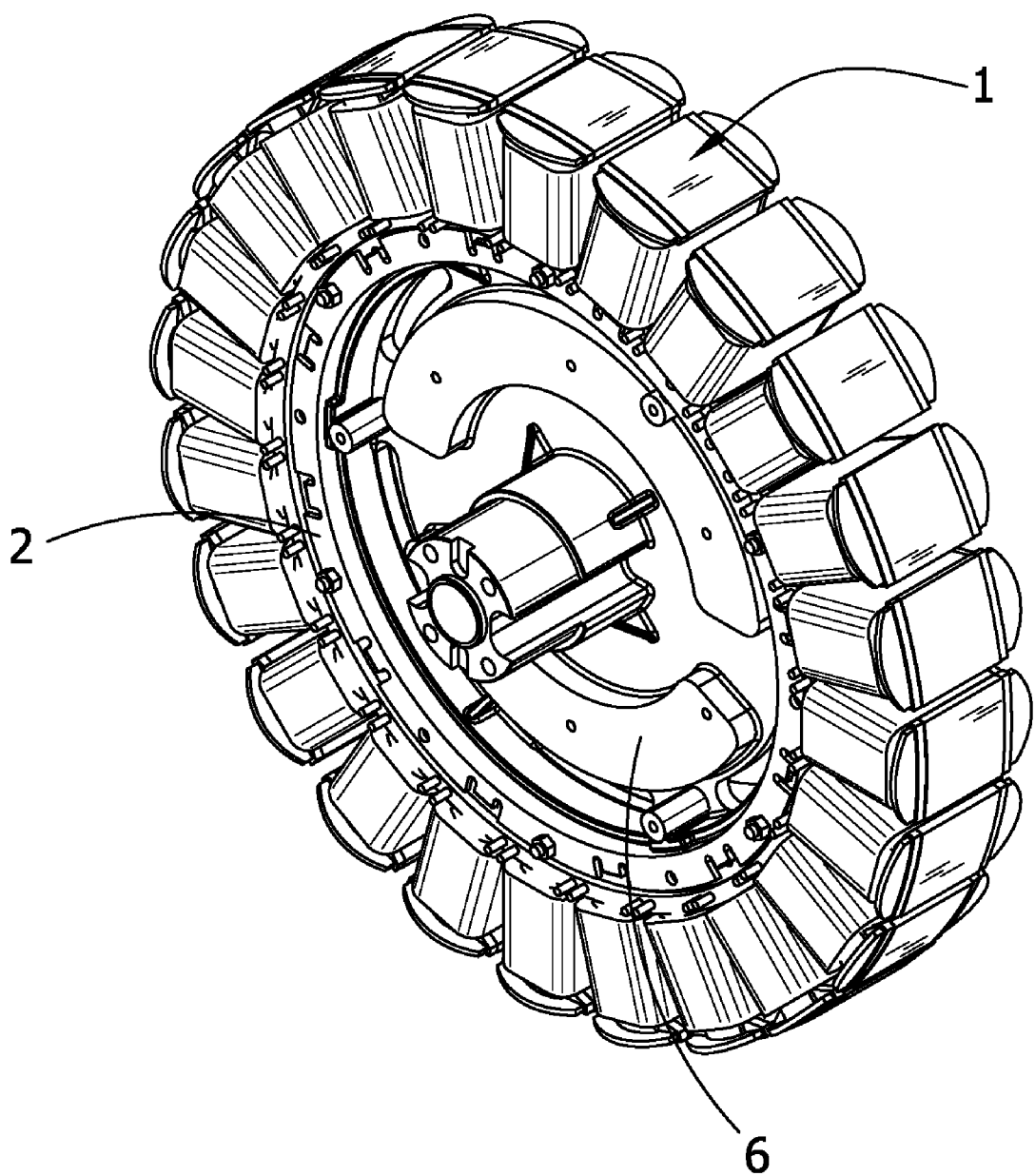
FIG. 8 is a perspective view showing the segmented inner stator in an assembled configuration.

As shown in FIGS. 5 and 7, the through hole 11, which passes through the core segment 7, is provided at the center of the long slot 10 with the hole of the core segment 7 and a hole 14 corresponding to the through hole 11 is provided on the flange 12 of the retaining rings 2, 3 on every other projection 13. Thus, after the retaining rings 2, 3 are assembled on to the stator core 1', the core segment 7 and the two retaining rings 2, 3 located before and after the core segment are secured together along the axial direction every other long slot 10 with hole (i.e. every other projection 13) by a fastener such as a screw (or bolt) 4 and a nut 5. It is understood that more or fewer holes and fasteners can be provided to secure the core segments to the retaining rings. For example, as shown in FIG. 8, a screw is disposed on every three projections. As a result, six screws and nuts are used.

Besides the above configurations, a hub 6 can be assembled into the inner hole of the circular retaining rings 2, 3. The hub 6 can be mated with the inner hole of the retaining rings 2, 3 to thereby strengthen the entire segmented stator configuration. The hub 6 can support the rotation of the outer rotor of the brushless permanent magnet motor so as to drive the electric bicycle or washing machine to rotate. Of course, the hub 6 may be provided with a plurality of lugs with holes, through which the screw can pass for securing the retaining rings 2, 3 and the core segments 7 to thereby secure the hub 6 with the retaining rings and the core segments.

In one embodiment of this invention, the number of core segments 7 is equal to the number of stator slots, e.g. the stator core 1' comprises 24 core segments and 24 stator slots, and it may be wound alone, thus it is particularly convenient to wrap wires.

It is intended that the above descriptions to the embodiments of this invention in conjunction with the drawings be merely interpreted as illustrative and not in a limiting sense, and many variants and modifications would be made to this invention.

For example, a mounting ring may be used to replace the above two retaining rings, and flanges extending along the radial direction are provided on the circumference of the two axial side surfaces of the mounting ring respectively, just like the retaining rings as described above. The two flanges clamp a core segment and the distance therebetween corresponds to the thickness of the core segment. A plurality of through holes, the number of which corresponds to the number of the core segments, are provided on the two flanges regularly along the circumferential direction. When assembling, each core segment is assembled with the mounting ring by the screw which passes through each core segment and the through hole. Here, the long slot with hole on the core segment is unnecessary.

Besides, a plurality of through holes, the number of which corresponds to the number of core segments, are provided regularly on the body portion of the mounting ring, and a threaded hole corresponding to the through hole is provided at the midpoint of one end of the core segment facing the mounting ring. It shall be noted that the through holes on the core segments are designed such that the head of the screw is embedded into the inner surface of the mounting ring after each core segment is secured on the mounting ring from the inner surface of the mounting ring by the screw which passes through the through hole, that is, the through hole is designed as a counter bore, thereby not to disturb the mounting of the hub.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products and methods without departing from the scope of the invention, it is intended that all matter contained in the above description and shown in the accompanying drawings shall be interpreted as illustrative and not in a limiting sense.

What is claimed is:

1. A segmented inner stator for a brushless permanent magnet motor, the segmented inner stator comprising a stator core having a plurality of radially-extending poles separated by spaces, each of said poles being adapted for receiving a stator winding thereon, said stator core including a plurality of core segments which are mated and retained together in a circular arrangement by at least one retaining ring, wherein each of at least some of the core segments has an opening on an axially-facing surface, the retaining ring having a radial extension extending along the axially-facing surface of the core segments and a plurality of axial projections extending from the radial extension of the retaining rings into at least some of the openings in the core segments so that the core segments are retained axially and radially relative to each other and relative to the retaining ring, said spaces between the poles being substantially free of said axial projections.

2. The segmented inner stator for a brushless permanent magnet motor according to claim 1 wherein each of at least some of the core segments is provided with a hole on the axially-facing surface, the radial extension portion of the retaining ring includes a plurality of holes, each of which is generally aligned with a hole in at least one of the core segments, and the stator further comprises a fastener mounted in at least one of the holes in the retaining ring and at least one hole in one of the core segments.

3. The segmented inner stator for a brushless permanent magnet motor according to claim 1, wherein the stator comprises two retaining rings which are assembled from opposite axial sides of the core segments to retain the plurality of core segments.

4. The segmented inner stator for a brushless permanent magnet motor according to claim 2, wherein the holes in the core segments form at least a portion of said openings on the axially-facing surfaces of the core segments.

5. The segmented inner stator for a brushless permanent magnet motor according to claim 4, wherein each of said openings in the core segments comprises a slot, and the plurality of axial projections on the radial extension portion of the at least one retaining ring are disposed in alternating slots.

6. The segmented inner stator for a brushless permanent magnet motor according to claim 2, wherein the inner stator is provided with a hub onto which the core segments and retaining ring are secured by the fastener.

7. The segmented inner stator for a brushless permanent magnet motor according to claim 1, wherein each of the core segments comprises a projection and a concave notch on opposite circumferentially-facing surfaces for engaging with the adjacent core segments.

8. The segmented inner stator for a brushless permanent magnet motor according to claim 3, wherein each of the retaining rings comprises an axial extension portion extending along radially inward-facing surfaces of the core segments, said axial extension portions being engaged with each other.

9. The segmented inner stator for a brushless permanent magnet motor according to claim 1, wherein the number of core segments is equal to the number of stator openings.

10. The segmented inner stator for a brushless permanent magnet motor according to claim 9, wherein the number of the core segments is 24.

11. A brushless permanent magnet motor equipped with the segmented inner stator according to claim 1.

12. The segmented inner stator for a brushless permanent magnet motor as set forth in claim 1, wherein each of the openings in the core segments is substantially radially aligned with a respective one of the poles.

13. A segmented inner stator for a brushless permanent magnet motor, the segmented inner stator comprising a stator core having a plurality of radially-extending poles separated by spaces, each of said poles being adapted for receiving a stator winding thereon, said stator core including a plurality of core segments which are mated and retained together in a circular arrangement by at least one retaining ring, wherein each of at least some of the core segments has an opening on an axially-facing surface, said opening being substantially radially aligned with a respective one of the poles, the retaining ring having a radial extension extending along the axially-facing surface of the core segment and a plurality of axial projections extending from the radial extension of the retaining rings into at least some of the openings in the core segments so that the core segments are retained axially and radially relative to each other and relative to the retaining rings.

14. The segmented inner stator for a brushless permanent magnet motor according to claim 13 wherein each of at least some of the core segments is provided with a hole on the axially-facing surface, the radial extension portion of the retaining ring includes a plurality of holes, each of which is generally aligned with a hole in one of the core segments, and the stator further comprises a fastener mounted in one of the holes in the retaining ring and a corresponding hole in one of the core segments.

15. The segmented inner stator for a brushless permanent magnet motor according to claim 14, wherein the holes in the core segments form at least a portion of said openings on the axially-facing surfaces of the core segments.

16. The segmented inner stator for a brushless permanent magnet motor according to claim 15, wherein each of said openings in the core segments comprises a slot, and the plurality of axial projections on the radial extension portion of the at least one retaining ring are disposed in alternating slots.

17. The segmented inner stator for a brushless permanent magnet motor according to claim 14, wherein the inner stator is provided with a hub onto which the core segments and retaining ring are secured by the fastener.

18. The segmented inner stator for a brushless permanent magnet motor according to claim 13, wherein the stator comprises two retaining rings which are assembled from opposite axial sides of the core segments to retain the plurality of core segments.

19. The segmented inner stator for a brushless permanent magnet motor according to claim 18, wherein each of the retaining rings comprises an axial extension portion extending along the radial inner surface of the core segments, each of said axial extension portions being engaged with another axial extension portion.

20. The segmented inner stator for a brushless permanent magnet motor according to claim 13, wherein each of the core segments comprises a projection and a concave notch on opposite circumferentially-facing surfaces for engaging the adjacent core segments.

21. The segmented inner stator for a brushless permanent magnet motor according to claim 13, wherein the number of core segments is equal to the number of stator openings.

22. A brushless permanent magnet motor equipped with the segmented inner stator according to claim 13.

23. The segmented inner stator for a brushless permanent magnet motor according to claim 1, wherein said openings in the core segments and the axial projections of the retaining ring are positioned radially inward from the poles.

24. The segmented inner stator for a brushless permanent magnet motor according to claim 13, wherein said openings in the core segments and the axial projections of the retaining ring are positioned radially inward from the poles.

* * * * *